RANDOM ACCESS-SERIAL TAPE DATA STORAGE SYSTEM

Filed Sept. 12, 1961

INVENTOR.
ARNOLD R. BEAVER
BY
Meyer, Baldwin, Doran & Egan
ATTORNEYS

INVENTOR.
ARNOLD R. BEAVER
BY
Meyer, Baldwin, Doran & Egan
ATTORNEYS

RANDOM ACCESS-SERIAL TAPE DATA STORAGE SYSTEM

Filed Sept. 12, 1961 4 Sheets-Sheet 3

INVENTOR.
ARNOLD R. BEAVER
BY
Meyer, Baldwin, Doran & Egan
ATTORNEYS

Feb. 2, 1965 A. R. BEAVER 3,168,232

RANDOM ACCESS-SERIAL TAPE DATA STORAGE SYSTEM

Filed Sept. 12, 1961 4 Sheets-Sheet 4

INVENTOR.
ARNOLD R. BEAVER
BY
Meyer, Baldwin, Doran & Egan
ATTORNEYS

United States Patent Office 3,168,232
Patented Feb. 2, 1965

3,168,232

RANDOM ACCESS-SERIAL TAPE DATA STORAGE SYSTEM

Arnold R. Beaver, 44 Elm St., Morristown, N.J.
Filed Sept. 12, 1961, Ser. No. 137,621
7 Claims. (Cl. 226—119)

This invention relates to a new and improved data storage system and more particularly to random access-serial tape data storage system which provides a true combination of serial and random access processing of data.

Heretofore data tape as generally referred to, has been used in various types of computer systems as one means of storing information, such as for example records of inventory or accounting and the like, and which records may be amended by said system as the items of inventory or accounting records, respectively, likewise change.

Said data tape may include among others as will be understood, magnetic tape, photographic film in strip form, magnetic wire and the like.

Oftentimes, it is desirable to seek out merely the information stored on only a predetermined portion of the data tape, for example a portion in the middle of said tape.

In present day data storage systems much time is usually consumed in seeking out and presenting the desired data tape portion to the tape reading apparatus. Also, the methods of data tape storage usually incorporated in present day data storage systems, oftentimes requires, when using extended lengths of data tape, the same if not more space than its associated computer system.

It is therefore a primary object of the present invention to provide a novel and improved random access-serial tape data storage system which is especially designed to use data tape therein to provide for random-serial access of stored information on selected portions of said tape.

Another object of the present invention is to provide a novel and improved random access-serial tape data storage system which is especially designed for use with an endless data tape or tapes and which system is operable to provide for random-serial access of stored information on preselected portions of said endless tape or tapes.

Another object of the present invention is to provide a new and improved random access-serial tape data storage system especially designed for use with an endless data tape or tapes, and wherein said system is adapted to accommodate a substantially large number of said tapes within a minimum amount of space.

Still another object of the present invention is to provide a new and improved random access-serial tape data storage system especially designed for use with an endless data tape and/or tapes, and wherein said system includes means for suspending said tape and/or tapes about a common axis.

Another object of the present invention is to provide a new and improved random access-serial tape data storage system especially designed for use with an endless data tape and/or tapes, and wherein said system includes a plurality of plate members supported on a common shaft, each of said members having means for suspending an endless data tape thereon, said tape being continuously suspended between said members circuitously around said shaft.

Another object of the present invention is the provision of a novel and improved random access-serial tape data storage system as is above defined, and wherein said system includes drive means operable to selectively advance the endless tape and/or tapes so as to readily present any predetermined portion thereof to the reading apparatus of the computer system with which it is used.

Other objects and advantages of the present invention will be apparent to one skilled in the art to which it pertains, and upon reference to the following disclosure of a preferred embodiment thereof, and which embodiment is illustrated in the accompaying drawings wherein.

Briefly, the data tape storage system of this invention is intended to offer an information storage system having a true combination of both serial and random access processing of data in one system.

When random access to stored data is required, it is believed that this device with its random access features may be incorporated into existing serial systems with little or no modification to said system.

The system in its basic concept incorporates the use of data tape supporting means spaced apart on a vertical or horizontal axis and supporting an endless data tape between said supporting means around said axis.

A data tape reading head is positioned so as to be readily available to any one part of the endless data tape.

The system may consist of multiple pairs of data tape supporting means mounted in spaced relation on the same horizontal or vertical axis. One or a plurality of endless data tapes may be suspended between said spaced pairs of supporting means around said axis. The reading head is mounted so as to be available to each tape, being movable from one pair to another of said supporting means.

Figure 1:
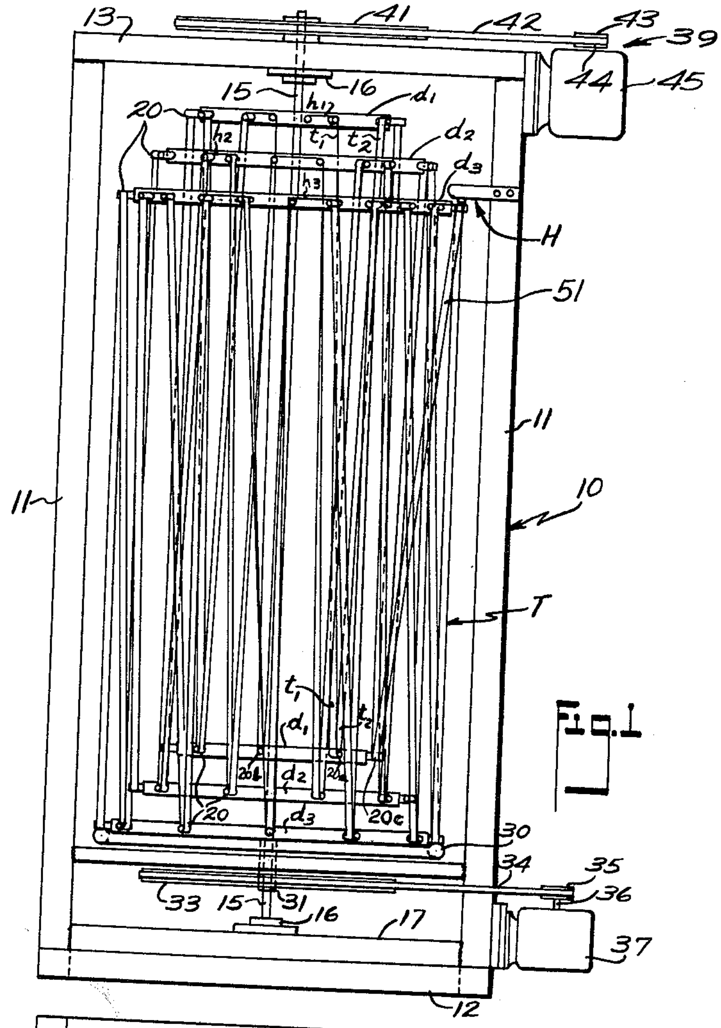
FIG. 1 is an elevational view of a data tape storage system embodying the inventive concepts of the present invention.
Figure 2:
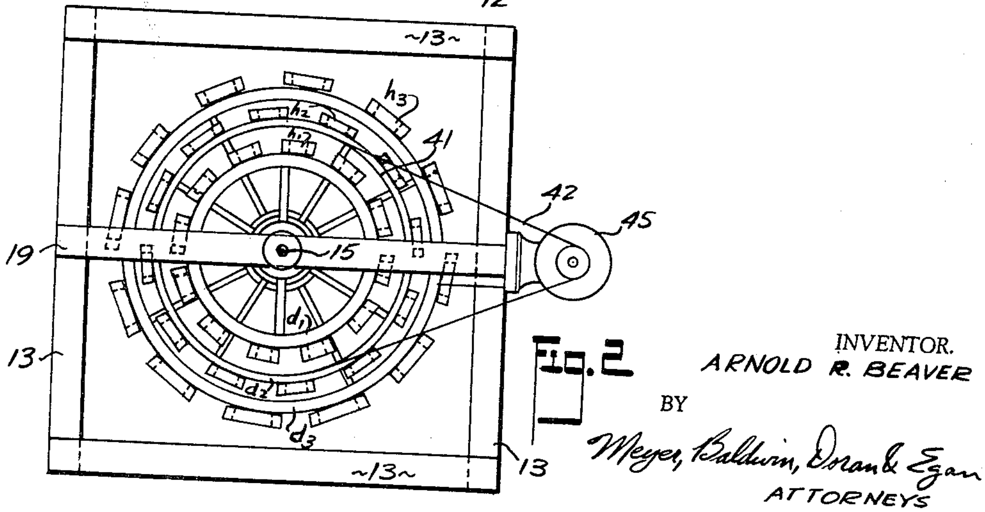
FIG. 2 is a plan view of the data tape storage system shown in FIG. 1.

As one embodiment of random access-serial data tape storage system of the present invention, reference is now directed to FIGS. 1 and 2 of the drawings wherein said system is herein seen to include a substantially rectangular box-like frame, as is identified in its entirety by the reference numeral 10, and which includes upright supports 11 connected at the lower ends thereof to a base member 12, opposed pairs of said supports at the upper ends thereof connecting to opposite ends of a brace member 13.

A shaft member 15 is vertically rotatably supported centrally within said frame by means of a pair of suitable bearing mounts 16, one of which is securely fastened to the top surface of a platform 17 carried centrally on the aforesaid base 12, the remaining bearing mount being preferably disposed substantially mounted upon the under side of a vertically overhead and suitable cross bar 19, the latter extending across the top of the frame 10 and connecting at the ends thereof to the midportions of opposite brace members 13.

A plurality of tape suspension members are centrally mounted on said shaft 15, being preferably disposed in spaced pairs, the instant tape storage system utilizing a series of three pairs of said suspension members, each member of each pair being respectively identified by the reference character *d*1, *d*2, and *d*3.

As best seen in FIG. 1, each suspension member of each pair is preferably of the same diameter. Likewise, the pair of members *d*1 is preferably of smaller diameter than the pair of members *d*2, the pair of members *d*2, in like manner, being preferably smaller in diameter than the pair of members *d*3.

Said tape suspension members are preferably mounted on the shaft 15 in two spaced groups, each group comprising one member from each of said pairs, the member *d*1 of each group preferably being mounted on the shaft 15 so as to be the uppermost member in each group, the member *d*2 of each group being the next lower and the member *d*3 being the lowermost of each group. The suspension members of each group are likewise preferably disposed in parallel spaced relation to each other.

Each of said tape suspension members mounts a plurality of spools on the periphery thereof as identified by the reference numeral 20, said spools being preferably disposed in predetermined radial spaced relation therearound.

An endless data storage tape as identified in its entirety by the reference character T, is intended to be continuously suspended substantially vertically between each pair of tape suspension members *d*1, *d*2, and *d*3, and to accomplish this, said tape is first preferably looped under one of the spools 20 on the smaller member *d*1 in the lower group, such as for example the spool as identified in FIG. 1 by the reference numeral 20*a*. Next, the tape runs *t*1 and *t*2 extending upwardly from opposite sides of said spool 20*a* are passed through the members *d*2 and *d*3 in the upper group. If desired, the members of each group in the present embodiment may take a form similar to a spoked wheel or the like to thus facilitate passing the endless tape therethrough.

The tape run *t*1 is then passed over a pair of spools 20 disposed adjacent each other on the upper suspension member *d*1, located therein vertically above the spool 20*a* and passed downwardly to the spool 20*b* on the lower member *d*1 adjacent to the spool 20*a* in a clockwise direction relative to the shaft 15. The tape run *t*1 is thus continuously suspended vertically between the spaced pair of members *d*1 and is progressively advanced in a serpentine fashion, circuitously around the periphery of the same in a clockwise direction relative to the shaft 15.

The tape run *t*2 is likewise passed upwardly from the spool 20*a* through the suspension members *d*2 and *d*3 in the upper group and preferably over the next adjacent pair of spools located on the suspension member *d*1 in said upper group next adjacent, in a counter-clockwise direction, to the initial pair of spools supporting tape run *t*1, and then passed downwardly and around the spool 20*c* located on the member *d*1 in the lower group, adjacent to the spool 20*a* in a counter-clockwise direction relative to the shaft 15. The tape run *t*2 is thus continuously suspended vertically between the pair of suspension members *d*1, and likewise is progressively advanced in serpentine fashion, circuitously around the periphery of the same in a counter-clockwise direction relative to the shaft 15.

When said endless data tape T has been extended completely around and between the suspension members *d*1, it is next passed to the next larger pair of members *d*2 and similarly suspended therebetween, and thereafter to the outermost pair *d*3. And, as said tape is completely extended around member *d*3, it is next returned to one of the aforesaid disk members *d*1, as seen by the return run 51 in FIG. 1.

As best seen in FIG. 1, the endless data tape, as is aforementioned, preferably passes over pairs of spool members 20 on each of the tape suspension members in said upper group to thereby define a small horizontal reading portion extending therebetween, which portion, in each instance, being identified by the reference character *h* with the suffix 1, 2 or 3 added thereto to identify its corresponding tape suspension member.

Although not to be considered a part of the present invention, an information reading head H, not herein shown in detail, is intended to be moveably supported upon the aforementioned frame 10 so as to be selectively moved over any one of the aforementioned horizontal reading tape portions *h*1, *h*2, and *h*3 being thus in position to read the information stored therein as said tape is passed thereunder.

The endless data tape as thus suspended between the spaced pairs of suspension members *d*1, *d*2, and *d*3, is intended to be advanced on its supporting spools 20 selectively in either direction between said members circuitously around the shaft 15.

For this purpose, a drive wheel 30, preferably constructed of a suitable pliable material such as rubber or the like, is rigidly mounted on a bushing 31, the latter being rotatably carried on the aforesaid shaft member 15, preferably adjacent the underside of the larger member *d*3 in the bottom group, and in such manner that the drive wheel 30 is in frictioinal engagement with the endless tape T passing underneath each of the spools 20 carried on the periphery of said lower member *d*3. A suitable pulley 33 is rigidly mounted on the aforementioned bushing 31, and is adapted to accommodate an endless drive belt 34, the latter likewise passing around drive pulley 35 carried on the shaft 36 of a suitable power source such as a reversible electric motor as is indicated at 37.

With this assembly, upon the energization of the motor 37, the drive wheel 30 will be rotated about the supporting shaft 15 in a corresponding direction, said wheel being thus effective to advance said endless tape circuitously between its pairs of supporting suspension members *d*1–*d*3 to thereby pass the said tape continuously under the reading head H.

It is also intended to provide for indexing the supporting tape suspension members to thus locate selective runs of said tape adjacen the reading head H, so that the same is immediately available for reading thereby. For this purpose an indexing mechanism as is indicated in its entirety at 39 is preferably carried on the upper end of the aforesaid frame 10 and is intended to simultaneously rotate the shaft 15 and said tape suspension members carried thereon being thus operable to likewise index the endless tape T supported therebetween relative to the reading head H.

For this purpose, said indexing mechanism 39 includes a pulley member 41 rigidly mounted on the upper end of the shaft 15, and accommodating a drive belt 42 thereon, said belt, in like manner, passing around a drive pulley 43 carried on the shaft 44 of a suitable drive motor 45.

By energization of said motor the shaft 15 and said members *d*1–*d*3 will likewise be rotated therewith selectively in either direction so as to index the endless tape around said shaft and thereby locate a preselected portion thereof adjacent the reading head.

In this manner, by indexing the tape supporting means while at the same time selectively positioning the reading head H, any preselected portion of tape may be located, this being accomplished within a minimum interval of time.

As will also be recognized by the skilled artisan, the present endless data tape suspension system is likewise readily applicable for use with computer systems especially designed to keep a running serial inventory of a plurality of separate items wherein the quantity of each of said items remaining in inventory is continuously changing. The tape portion having the information therein concerning any one particular item may thereby be made readily available at random to said system for changing said information according to the depletion of said item in inventory.

It will also be realized that with the endless data tape suspension system as just described, an endless tape of any preselected size may be readily mounted in a minimum amount of space while yet permitting any predetermined part thereof to be immediately available for obtaining the information contained therein.

Figure 3:
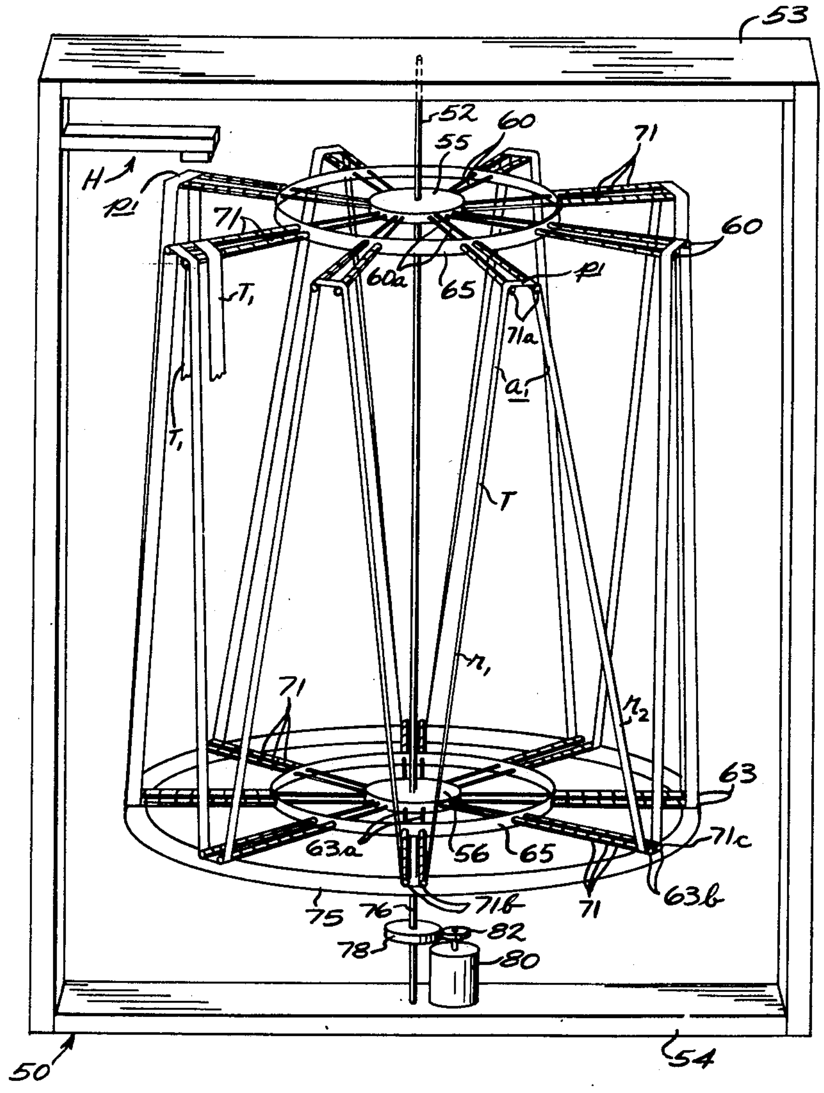
FIG. 3 is a perspective view of a second embodiment of data storage system.

With reference now directed to FIG. 3 of the drawings, a modified arrangement of data tape storage system is herein disclosed, and which is applicable to support a plurality of endless data tapes thereon circuitously around a vertical axis.

As seen in FIG. 3, the present embodiment of storage system includes a supporting frame 50, the instant form being preferably of rectangular configuration, and which suitably centrally rotatably mounts an axle 52 in a vertical position between its upper and lower cross members 53 and 54 respectively. A pair of tape suspension members, each being identified respectively by the reference numerals 55 and 56, are seen to be rotatably mounted on the aforesaid axle 52, in vertical spaced relation thereon, the purpose for which will be hereinafter described in detail.

Pairs of spindles or rods 60, spaced circumferentially around the upper suspension member 55, are each seen to have one end thereof securely fastened to the peripheral surface of the latter in such manner as to extend approximately radially outwardly from the aforementioned axle 52.

In like manner, pairs of spindle or rod members 63 spaced circumferentially around the lower tape suspension member 56 are each seen to have one end securely fastened to the peripheral surface of the latter in such manner as to likewise extend approximately radially outwardly from the aforesaid axle 52.

A supporting ring 65 surrounding each of said tape suspension members likewise supports each of said spindles extending outwardly from the latter to thus provide additional rigidity to said assembly.

A plurality of data storage tapes T are suspended circuitously around the axle 52 by and between the tape suspension members 55 and 56.

For this purpose each of the spindles 60 and 63 carried respectively on support members 55 and 56 has a plurality of spools 71 rotatably mounted thereon, the spools 71 on each spindle being in turn, preferably connected or otherwise pinned together so as to be rotatable as a unit.

An endless data tape T is seen to be threaded over the outermost spools 71 carried on the spindles 60 and 63 in a serpentine fashion as seen in FIG. 3 circuitously around the axle 52. For example, the tape loop $a_1$ of tape T is seen to be threaded over the outermost spools **71*a* on one pair of spindles 60*a* carried on upper supporting member 55, to define a reading portion $p_1$, the left tape run $r_1$ thereof extending downwardly from said loop $a_1$ and then under and around the outermost spools 71*b* on the next adjacent pair of spindles 63*a* extending clockwise around lower supporting member 56. Tape run $r_2$ is likewise seen to extend downwardly from the opposite end of tape loop $a_1$ and then under and around the outermost spools 71*c* on the next adjacent pair of spindles 63*b* extending counterclockwise around the lower supporting member 56**.

Said tape T is thence continued in like manner circuitously around the aforementioned axle being thus preferably suspended upon the outermost spools on each of the spaced pairs of spindles 60 and 63 so as to be movably supported thereon at a constant radial distance from said axle.

In like manner, additional endless data tapes such as is identified at $T_1$ may be suspended between the vertically spaced spindles 60 and 63, being selectively supported on any one of the remaining groups of spools carried on said spindles, each group of spools being identified as those spools disposed at the same radial distance from the axle 52, being thus operable to advance said tape circuitously around the aforesaid axle, it being likewise apparent that as many tapes as there are groups of spools being accommodated thereon; it being likewise obvious that said tapes will necessarily be of different circumferential dimensions in accordance with the location of its supporting group of spools.

To advance each of said endless tapes circuitously around the axle 52, the instant embodiment of data storage system includes a friction drive wheel 75 which is seen to be mounted on the upper end of bushing 76 in the same manner that the drive wheel 30 is mounted on the bushing 31 in the previous embodiment, the drive wheel 75 being disposed over the axle 52 below the suspension member 56 and mounting in turn, pulley 78 on its opposite end. The drive wheel 75 is disposed so as to be in friction engagement with the underside of the outermost spool 71 on each of the pairs of spindles 63, and as will be recalled, the spools on each spindle are likewise pinned to each other whereby as each outermost spool is rotatably driven, the spools connected thereto will likewise rotate with the same and at the same velocity.

Electric motor 80 carried on the cross bar 54 of the frame 50 has a friction drive wheel 82 mounted on its shaft and which is disposed so as to be in friction engagement with the pulley 78, being thus effective to rotate the drive wheel 75 and hence the aforesaid spools. In this manner, as will now be apparent each of said endless tapes is advanced around the axle 52 at approximately the same velocity with respect to each other.

As will now be apparent, the spools mounted on each of the upper and lower pairs of spindles 60 and 63, respectively, may be replaced by a single shell having a corresponding exterior configuration, and likewise being thus capable of supporting the endless tapes thereon.

As will likewise be apparent, each of the spindles 60 and 63 may be rotatably mounted in or upon its tape suspension members and stabilizer ring 56 and the said spools 71 carried thereon may be in turn, rigidly fastened to the latter whereupon the spools and supporting spindle is rotatable as a unit.

As in the previous embodiment, an information reading head H shown herein in diagrammatic form is intended to be positioned in reading association with each of the tape reading parts $p_1$ to thereby read the information stored thereon.

Figures 4, 5, 7, 8:
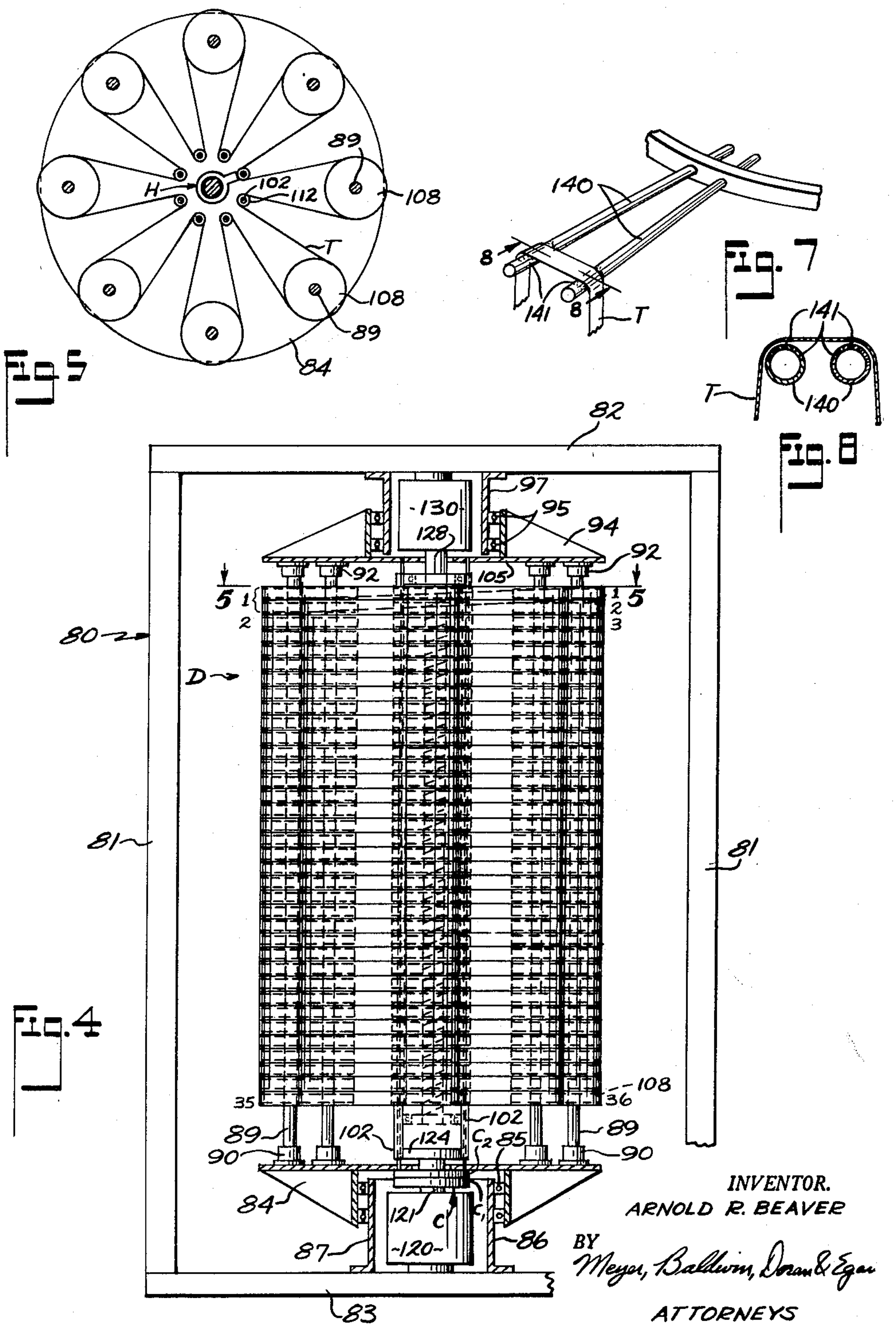
FIG. 4 is a side elevational view of a third embodiment of data storage system embodying the present invention.
FIG. 5 is a plan view of the system shown in FIG. 4.
FIG. 7 is a fragmentary perspective view of a modified tape supporting spindle and axle assembly applicable for use in any of the embodiments of storage system disclosed herein.
FIG. 8 is a vertical sectional view taken on the plane as is indicated approximately by the line 8—8 in FIG. 7.

In FIGS. 4 and 5, there is herein shown another embodiment of data tape storage system, particularly applicable to support a plurality of endless data tapes in horizontal levels disposed one on top of the other, in a vertical tape deck or stack D, said tapes being likewise extended circuitously around a vertical axis whereby random serial access may be had to any of said tapes.

With reference directed particularly to FIG. 4, the instant embodiment of data storing system is seen to include a supporting frame identified in its entirety by the reference numeral 80 having upright side members 81 attached to an upper cross bar 82 and a base 83.

A turntable 84 is rotatably mounted by means of suitable bearings 85 to the depending wall 86 of an upstanding shell 87, the latter being mounted preferably centrally upon the aforementioned base 83. A plurality of axles 89 are disposed in circumferential spaced relation on the aforementioned turntable preferably equally radially spaced thereon, each of said axles being suitably mounted within a bearing support 90 carried on the upper face of said turntable. Said axles, as seen in FIG. 4 extend vertically upwardly from said turntable preferably in parallel spaced relation each to the other, the opposite end of each axle being similarly mounted in a bearing support 92 attached to the underside of cap member 94. Said cap member, in turn, is likewise seen to be rotatably mounted by bearings 95 to the peripheral wall of shell member 97, the latter being rigidly attached to the upper cross bar 82 of the aforesaid frame 80 and depending preferably centrally downwardly therefrom.

A plurality of shafts 102 are each seen to have one end thereof mounted in the turntable 84 so as to be freely rotatable relative to the latter, being in turn, preferably equally spaced radially about the center of said turntable, said shafts extending upwardly vertically therefrom in parallel spaced relation each to the other and similarly mounted within the base wall 105 of the aforesaid cap member 94.

In the present embodiment, as seen in FIG. 5, there is the same number of shafts 102 as there are axles 89.

As before mentioned, the instant tape storage system is intended to accommodate a plurality of endless data tapes, disposed in substantially a vertical tape deck or stack. In the disclosed assembly thereof as best seen in FIG. 4, a plurality of thirty-five endless data tapes are intended to be accommodated thereon, and for this purpose, a plurality of spools 108 is disposed on each of the aforementioned axles 89 in such manner so as to be freely rotatable relative to each other and said associated axle. For reasons as will later appear, thirty-sir spools are disposed on each of said axles in the instant system assembly.

A like number of spools 112 is mounted on each of the aforesaid shafts 102, each of said spools 112 being securely fastened to its accommodating shafts so as to be rotatable therewith.

As will later appear, the spools 108 and 112 on each axle 89 and shaft 102 respectively, may be replaced by a single cylinder having a corresponding exterior configuration and which is similarly mounted thereon.

As best seen in FIG. 4, thirty-six tape levels are provided in the instant tape deck or stack assembly D, each level thereof having a spool 108 on each of the aforesaid axles 89 and a spool 112 carried on each of the aforesaid shafts 102, included therein.

As will likewise be noted with particular reference to FIG. 5, each of the shafts 102 is interspaced between two adjacent axles 89.

As previously mentioned, a plurality of thirty-five endless data tapes are intended to be accommodated on the instant assembly, one of said endless tapes as identified at tape position 1 in FIG. 4, being disposed in the upper two of said tape levels whereas the remaining thirty-four data tapes being disposed respectively at tape level positions three through thirty-six.

As is also seen in FIG. 5, each of the endless data tapes T is mounted on the spools 112 and 108 disposed in its respective tape level, being looped over and around each spool 108 on the aforesaid axles 89 and thence extended inwardly and around each of the adjacent spools 112 carried on the shafts 102, being thus looped in serpentine fashion circuitously around the center of said turntable 84.

The endless data tape $T_1$ occupying, as referred to above, position 1 in tape levels one and two on the tape deck or stack D, is preferably looped circuitously around the aforesaid spools in the first tape level and thence passed downwardly therefrom as seen in FIG. 4 to the second tape level and thereafter extended around the spools in said latter level circuitously in a similar manner around the turntable.

As will now be apparent, a single endless data tape may, if desired, be suspended in a like manner to that just described within several or more tape levels in said tape deck, this particular arrangement as will be understood being readily applicable to accommodate endless data tapes of different lengths.

As previously mentioned, the endless data tapes T as thus suspended in said vertical tape deck D, are each intended to be advanced circuitously around the turntable so as to rapidly present any predetermined portion or part thereof to a conventional data reading head, the latter, as aforementioned, forming no part of the present invention and hence shown herein in diagrammatic form and identified by the reference character H.

For this purpose, a suitable drive motor 120 is mounted on the base 83 of the said frame, being preferably disposed within the shell member 87 and having its shaft 121 mounting a friction wheel 124, said friction wheel, in turn, being preferably of such dimension as to be in friction engagement with the lower end of each of the aforementioned shafts 102.

With this assembly, it will now be realized that upon energization of the drive motor 120 said power will be transmitted through said friction drive to thereby rotate each of the shafts 102 and hence each of the spools 112 therewith so as to advance each of the endless data tapes circuitously around said turnable 84.

The aforesaid data reading head as is identified herein by the reference character H, is preferably mounted within the tape deck D so as to be readily movable to any one of said tape levels (1–36) and hence available to read the data thereon.

For this purpose, the data reading head H is carried on a lead screw 128, the latter being preferably rotatably mounted within the cap member 94 and extending downwardly therefrom and centrally between the aforementioned shafts 102.

As best seen in FIG. 5, the looped portions of each tape T extending around spools 112 may each be utilized as a reading portion by said head H.

The lead screw is drivingly connected at its upper end to the shaft of a suitable electric drive motor 130, said motor being preferably disposed within the shell member 97 whereupon energization of the same is effective to move the reading head H selectively to any one of said tape levels (1–36) and thus to a position for reading the information carried on the endless data tape disposed thereat.

To position any one predetermined portion of the endless data tapes so as to be readily available to the reading head H within a minimum period of time, the instant data tape storge system also includes means to rotate the turntable 84 and tape deck D carried thereon around the lead screw whereupon any predetermined portion of said endless data tape may be readily moved to the reading position then occupied by said head H.

For this purpose, a conventional clutch assembly as identified in its entirety by the reference character C is mounted on the motor shaft 121, and has a driving clutch plate $c_1$ rigidly fastened to said shaft 121 so as to be rotatable therewith, and a drivable clutch plate $c_2$ rigidly attached to the underside of the aforesaid turnable 84. With this assembly, upon the drivable clutch plate $c_2$ being moved into clutching engagement with the driving clutch $c_1$ the latter being in turn rotated by the motor 120, the turntable 84 will likewise be rotated to thus carry the tape deck D about the reading head H and hence present any preselected portion of any of the endless data tapes T in reading position relative to said reading head.

Figure 6:
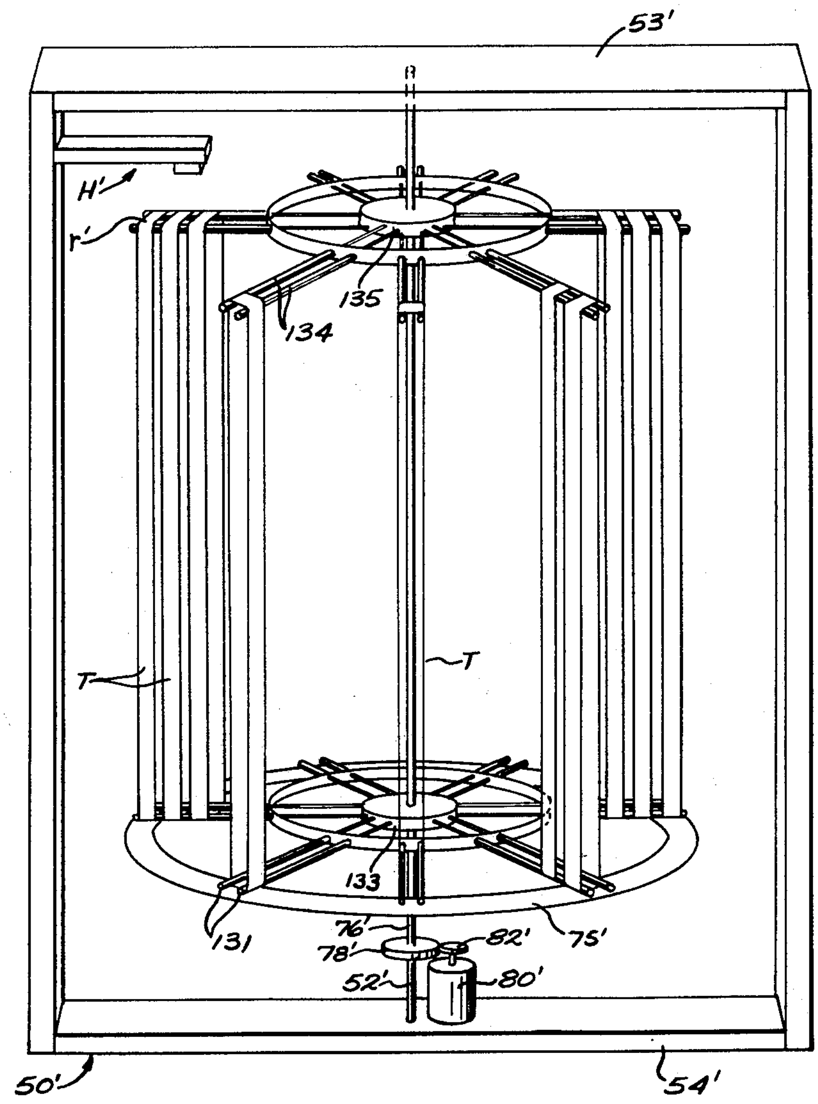
FIG. 6 is a side elevational view of a fourth embodiment of data storage system.

In FIG. 6 there is herein shown a fourth embodiment of data tape storage system which is especially designed to support a plurality of endless data tapes, each of which is adapted to be suspended between spaced pairs of spindles disposed preferably in vertical spaced relation to each other to thereby define a vertical tape deck.

The instant tape storage system is seen to be substantially similar to the previous embodiment as is disclosed in FIG. 3, differing from the latter by having each pair of spindle or rod members as identified at 131 that is mounted around the lower tape suspension member 133, disposed so as to be substantially vertically below one of the spaced pairs of spindle members 134 similarly mounted on the upper tape suspension member 135. In all other respects, the instant type storage system is preferably identical in its construction to the aforementioned previous assembly, and consequently merely for brevity, corresponding elements thereof are identified in FIG. 6 by like reference characters which are primed so as to facilitate a comparison therebetween.

A plurality of endless data tapes T are seen to be suspended on and between each vertically spaced pair of spindle members of the instant system embodiment, merely for purposes of the present disclosure, having eight (8) pairs of said spindle members extending radially outwardly from the axle 52′ and disposed in substantially equally spaced relation to each other.

With this assembly, upon energizing the tape drive means each data tape T is advanced around its supporting spindle members, the portion thereof passing over the upper spindle members of each pair defining a reading position as is identified at *r*′.

The tape reading head H′, as in the previous storage system is disposed so as to be in reading position with the tape portions *r*′ passing underneath the same.

Referring now to FIGS. 7 and 8, there is herein shown an air cushion or bearing means for supporting a moving endless data tape T as the same moves circuitously around supporting spindles which may be disposed on a horizontal or vertical axis.

Merely for purposes of the instant disclosure, said air bearing is herein adapted to the system embodiment that is shown in FIG. 3.

As seen in FIG. 7, an endless data tape T is looped over and around a pair of spindle members 140 adjacent the closed ends thereof, in a manner similar to that shown in FIG. 3, each of said spindle members being hollow and formed at said supporting end with a plurality of spaced apertures as identified at 141. Each of said spindles although not herein shown is intended to be connected in circuit with a suitable source of pressurized air whereupon said air exiting from said apertures forms a supporting cushion or air bearing over the spindle members which is effective to support the endless data tape T thereon as the latter is advanced thereover circuitously around the axis of the said system.

As will now be realized, with the endless data tape T thus supported on an air cushion or bearing, substantially no frictional forces are exerted thereon as a result of its being advanced thereover, being thus effective to increase its operative life.

As will likewise be realized, the mechanical assembly of said tape suspension system is substantially simplified thereby decreasing its cost of manufacture and maintenance.

Having thus described several preferred embodiments of data tape storage system embodying the concepts of the present invention as are hereinabove defined, it will be apparent to one skilled in the art to which it pertains that the same is susceptible of various modifications, combinations, and arrangements of parts without departing from the scope of said invention as is defined in the appended claims.

What is claimed is:

1. A random-serial access data tape storage system comprising a frame mounting an axle, a plurality of spindles disposed in two spaced groups along said axle, the spindles of each group being spaced around said axle and extending approximately radially outwardly therefrom, each spindle of each of said groups being aligned longitudinally of said axle with a spindle of the other of said groups to define a spaced pair, and at least one endless data tape suspended between each of said spaced pairs of spindles.

2. A random-serial access data tape storage system comprising a frame mounting an axle in approximately a vertical position, a plurality of spindles disposed in two spaced groups along said axle, the spindles of each group being spaced around said axle and extending horizontally radially outwardly therefrom, each spindle of each of said groups being aligned longitudinally of said axle with a spindle of the other of said groups to define a spaced pair, and at least one endless data tape suspended between each of said spaced pairs of spindles.

3. A random-serial access data tape storage system comprising a plurality of tape suspension members mounted in at least two groups spaced longitudinally one from the other along a common axis and said members of each group being disposed in radial spaced relation to each other around said axis, said endless data tape being suspended between said groups of suspension members circuitously around said axis; and drive means for advancing said data tape around said axis between said spaced group of suspension members.

4. In a random-serial access data tape storage system as is defined in claim 3 and wherein said suspension members include means defining an air bearing for movably supporting the endless data tape thereon.

5. In a random-serial access data tape storage system as is defined in claim 3 and wherein the drive means is in direct driving engagement with the data tape.

6. In a random-serial access data tape storage system as is defined in claim 3 and which includes drive means for advancing the suspension members around said axis.

7. In a random-serial access data tape storage system as is defined in claim 4 and wherein the means for movably supporting the endless data tape are disposed in spaced relation to each other on each of said suspension members.

References Cited in the file of this patent

UNITED STATES PATENTS

| | | |
|---|---|---|
| 1,175,205 | Turner | Mar. 14, 1916 |
| 1,412,216 | Price | Apr. 11, 1922 |
| 1,921,487 | Smith | Aug. 8, 1933 |
| 2,204,917 | Tondreau | June 18, 1940 |
| 2,224,947 | Blaney | Dec. 17, 1940 |
| 2,439,903 | O'Connell | Apr. 20, 1948 |
| 2,714,797 | Drummond et al. | Aug. 9, 1955 |
| 2,936,877 | Adams et al. | May 17, 1960 |
| 3,049,309 | Miller | Aug. 14, 1962 |

OTHER REFERENCES

IBM Technical Disclosure Bulletin, vol. 3, No. 6, page 11, November 1960.